United States Patent

[11] 3,565,176

| [72] | Inventor | Clifford V. Wittenwyler<br>1841 Arbor Lane, Union, N.J. 07083 |
|---|---|---|
| [21] | Appl. No. | 856,184 |
| [22] | Filed | Sept. 8, 1969 |
| [45] | Patented | Feb. 23, 1971 |

[54] CONSOLIDATION OF EARTH FORMATION USING EPOXY-MODIFIED RESINS
5 Claims, No Drawings

[52] U.S. Cl. .................................................. 166/270,
166/272, 166/295, 166/273
[51] Int. Cl. .................................................. E21b 33/138,
E21b 43/20, E21b 43/24
[50] Field of Search ............................................ 166/295,
294, 272, 273, 270, 268, 276, 305, 306

[56] References Cited
UNITED STATES PATENTS

| 3,176,769 | 4/1969 | Treadway et al. ............ | 166/295 |
|---|---|---|---|
| 3,193,007 | 7/1965 | Kiel et al. ..................... | 166/273 |
| 3,250,330 | 5/1966 | Smith, Jr. ..................... | 166/295 |
| 3,294,166 | 12/1966 | Havenaar et al. .............. | 166/295 |
| 3,297,089 | 1/1967 | Spain ............................. | 166/295 |
| 3,310,111 | 3/1967 | Pavlich et al. ................. | 166/295 |
| 3,316,966 | 5/1967 | Dear, Jr. ........................ | 166/295 |
| 3,339,633 | 9/1967 | Richardson .................... | 166/295 |
| 3,368,625 | 2/1968 | Wittenwyler .................. | 166/295 |

*Primary Examiner*—Stephen J. Novosad
*Attorneys*—George G. Pritzker and J. H. McCarthy ABSTRACT: A method of consolidating an unconsolidated earth formation on order to improve subsequent oil recovery by means of a fluid drive, comprising treating the formation with (1) a liquid hydrocarbon preflush, (2) a resinous solution containing an epoxy resin forming material, an amine curing agent, an organic ester of a pentavalent phosphorus compound coupling agent and, if desired, optimally adding a silane, said additives being dispersed or dissolved in a liquid solvent and (3) and optimally if desired using an overflush comprising of a hydrocarbon liquid.

CONSOLIDATION OF EARTH FORMATION USING EPOXY-MODIFIED RESINS

BACKGROUND OF THE INVENTION

This invention relates to an improved process for preparing earth treating compositions, and more particularly for preparing compositions to be used for treating unconsolidated earth formations surrounding oil wells. In particular, it relates to the preparation of compositions used for treating preferentially water wetted unconsolidated earth formations surrounding oil wells to improve their permeability to oil and for consolidating unconsolidated or substantially unconsolidated formations such as loose sand, particularly surrounding oil wells while retaining a substantial degree of permeability to oil therein.

STATE OF ART

It is well known in the art that various resin forming compositions can be used to consolidate unconsolidated earth formations in order to subsequently improve oil recovery therefrom as described in the Journal of Petroleum Technology for Apr. 1967, pages 487—494, or Dec. 1966, pages 1537—1543, or Dec. 1961, pages 1221—1229, or as described in numerous U.S. Pat. Nos. such as 3,297 289, 3,294,168, 3,123,138, 3,302,718, 3,221,814, or 3,294,166. However, a number of problems are presented when shallow unconsolidated low temperature, generally below 150° F. and even below 125° F. formations are to be consolidated since the time for effecting consolidation under such conditions is very difficult to control, time consuming, and very costly. Also, when consolidating earth formations under high-temperature conditions normally encountered when consolidating deep formations as described in U.S. Pat. Nos. 3,339,633 and 3,294,166 and articles such as described in World Oil of Jun. 1968, pages 81—84 or Oil and Gas Journal for Apr. 21, 1969, which articles are based on the disclosure of these two patents, require special equipment and techniques in order to control reaction rates of the resinous consolidating materials which adds to the cost of the process.

THE ESSENCE OF THE INVENTION

It has now been discovered that the compressive and tensile strength of unconsolidated earth formations subjected to wide temperature variations and which contain oil producing zones can be effectively improved and rendered essentially hydrolysis resistant during and after consolidation without essential modification in the permeability of the formation by using an epoxy-amine resin containing composition as will be herein fully described and subsequently recovering oil therefrom by use of a fluid drive such as water flooding by means of the following procedure:

a. preflushing the formation penetrated by at least one injection and one producing well with a liquid hydrocarbon containing solution;

b. injection into the mass to be consolidated, a hydrocarbon solvent into which is incorporated a mixture of polyepoxides having a plurality of vicinal epoxy groups and polyamines having a plurality of nitrogen atoms having at least one hydrogen atom attached to each nitrogen atom, an organic phosphate ester and optimally adding a silane said mixture of organic compounds being dispersed or dissolved in a liquid solvent; and c. optimally overflushing the permeable mass with a liquid hydrocarbon.

In the present invention, the resinous forming materials, namely, the epoxy compound and amine and the other materials, namely, the phosphate ester, such as alkyl and/or aryl phosphates are premixed at the surface, before injection into the reservoir formation to be consolidated and no problem is experienced in achieving the proper chemical proportion for effecting the best grain to resin bond strength. This is advantageous over known commercial processes in which the epoxy and amine are separately injected and are combined in situ. In addition, since the epoxy and amine by the process of this invention are partially polymerized when they are injected, they are less affected by naturally occurring substances in the reservoir.

In the process of this invention where generally mixtures of phosphate ester and polyepoxides and curing agents, e.g., amines are blended with one another above ground and are injected into a reservoir in a liquid vehicle from which they precipitate as the molecular weight of the epoxy curing agent polymer increases to the point it is no longer completely soluble in the vehicle. At the time of the precipitation of the polymer, the reaction normally reaches the gelling stage and considerable amounts of the liquid vehicle are generally incorporated in the polymer precipitated which increase the bulk of the polymer with a resulting decrease in permeability in the reservoir.

The overflush is an optional part of this process and is used when it is essential for the establishment or improvement of permeability. This becomes an important feature of this invention since it effects a partition of a predominately polymer phase from the solvent vehicle prior to the time the epoxy-amino polymer had reached the high molecular weights which causes it to precipitate from its vehicle. This predominately polymer phase is drawn into the small interstitial spaces at the contact points of the grains by capillarity and tends to carry the silt with it because of the high surface tension. The second effect of the overflush is to extract additional solvent from the polymer phase, thereby reducing its volume, leaving the reservoir more permeable. As the overflush extracts the vehicle from the polymer phase, it concentrates it further which also causes the polymerization reaction to proceed faster, resulting in a reduction in curing time. For example, 4 hours versus the usual 12 for known processes.

This invention contemplated the use of polyepoxides and polyamines mixed with one another which tend to have good wetting properties and also form superior bonds with earthen materials. For convenience, the polyepoxide and polyamine mixtures are often referred to herein as "resin," "polymer" or "epoxy-amine polymer and/or resin." These epoxy-amino resins are known to be quite superior to phenolic resins or epoxides cured with other curing agents, such as acid anhydrides and therefore, they are preferred curing agents in the practice of this invention.

More specifically, the present invention contemplates the use of polyepoxides which are those organic mixtures containing more than one vic-epoxy group

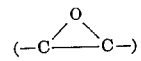

which can be incorporated in organic compounds which are saturated, unsaturated, aliphatic, cycloaliphatic, aromatic or heterocylic. Often, these polyepoxides are described in terms of their epoxy equivalent value, which is determined from the average molecular weight divided by the number of epoxy group per molecule. This terminology and the types of polyepoxides useful in this invention are disclosed in U.S. Pat. 2,633,458. More generally, the polyepoxides suitable for this invention are well-known materials of commerce and many are described in the book "Epoxy Resins" by Lee and Neville, McGraw-Hill, New York, 1957.

Examples of some polyepoxides useful in the practice of this invention are the glycidyl polyethers of dihydric phenols which can be prepared by the condensation of dihydric phenols with epichlorohydrin in an alkaline medium. Polyhydric phenols which can be condensed with epichlorohydrin to form these polyepoxides are resorcinol, catechol, hydroquinone, methyl resorcinol and polynuclear phenols, such as 2,2-bis (hydroxyphenyl)propane (Bhisphenol A), 2,2-bis (4-hydroxyphenyl) butane, 4,4-dihydroxybenzophenone, bis(4-hydroxyphenyl)ethane, 2,2-bis (4-hydroxyphenyl)pentane, 1,5-dihydroxynaphthalene, and the like. The above-mentioned polyhydricphenols may also contain ring halogen atoms and their condensation product with epichlorohydrin will contain the same.

The epoxide products obtained by the condensation of epichlorohydrin with these polyhydric phenols are not a single, simple molecule but a complex mixture of glycidyl polyethers having the well-known terminal vic-epoxy groups. The epoxy equivalent weight can vary about 120 to about 1,000 and the preferred average molecular weight can vary from about 300 to about 500 and preferably between 300 and 400.

As indicated above, the invention uses polyamines as curing agents for the polyepoxides described above. Not only are stronger resins obtained with the polyamine but the amines tend to impart preferential sand wetting properties to the partially polymerized epoxy-amino resins mixtures and yield stronger consolidation. Beyond these two important properties mentioned above, the polyamines are preferred because it is necessary that the curing agent be generally insoluble in the overflushing liquid, if used, which is predominantly a liquid hydrocarbon. In essence, the invention contemplates the use of polyamines which have a solubility of less than about 2—3 parts per 100 in the predominantly aliphatic liquid hydrocarbon used as the overflush (discussed more fully hereinafter). For example, the more soluble polyamines such as 1,2-diaminoethane, diethylene, triethylamine, N,N-dicyclohexanolamine and so forth would tend to be taken up (extracted) by the overflushing hydrocarbon leaving a deficiency of polyamine in relationship to the polyepoxide for the best bond strength. Thus, it is apparent that the parameter restricting the use of polyamines is that it be generally insoluble in the predominantly aliphatic hydrocarbons used for overflushing the solutions of the epoxyamine polymers or resins depolyed in the solvent vehicle.

Besides having the above solubility characteristics in the overflushing fluid, it is also desirable that the polyamines have two or more amino functional groups which have at least one active hydrogen. Amines having the requisite characteristics are sulfonyldianiline, 1,3-diaminobenzene, 4,4-methylene dianiline, and the like. A person skilled in the art can select any polyamines Celluflex FR2 the parameters set forth above from those well known in the art.

The organic phosphate esters which are used essentially as coupling agents include alkyl, aryl and/or alkaryl phosphates such as tri-alkyl phosphates or aryl phosphates such as tri$C_{2-18}$ alkyl phosphate, e.g., triethyl, tributyl, trioctyl, tristearyl phosphates or triphenyl, tribenzyl, trinaphtyl, diphenyethyl phosphates. Other phosphates which can be used are available under the trade names of Celluflex FR-2 or Firemaster T-23 P. The amount of phosphate ester such as triphenyl phosphate which is added to the epoxy-amino resin solution is governed by the temperature of the formation and can vary between 0.01 and 5 percent preferably between 0.1 and 1 percent based on the total volume of the resin containing solution.

The silane additive if used can be an organo-functional silane containing at least one silicon atom having one functional group suited for reaction with the particles of the mass to be consolidated and another functional group suitable for reacting with one of the components of the polyepoxide and polyamine polymer. Examples of an organo-functional silane are an "amino-functional silane" or an "epoxy-functional silane."

Especially if the materials to be consolidated contain large amounts of siliceous grains, such as send, the functional groups suitable for reacting with the grains of the mass to be consolidated are preferably alkoxy groups, such as methoxy of ethoxy groups. Examples of useful amino-functional silanes are: $(CH_3O)_3Si-CH_2-CH_2-CH_2-NH-CH_2-CH_2-NH_2$ (N-aminoethyl-aminopropyltriethoxy-silane) and
$(C_2H_5O)_3Si-CH_2-CH_2-CH_2-NH_2$
(aminopropyltriethoxy-silane).

Further, the following are examples of epoxy-functional silanes:

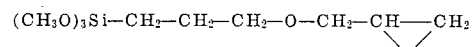
(glycidoxypropyltrimethoxy-silane) and

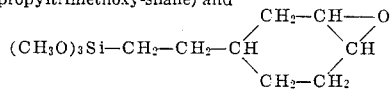

3, 4-epoxycyclohexylethyltrimethoxy-silane). These compounds can be obtained from the Silicones Division of Union Carbide Corporation, N.Y.C., under the symbols A1120, A1100, A174, A186 respectively The presence of even small amounts of the phosphate compounds alone or in combination with a silicone in the consolidation made according to this invention results in highly superior compression strengths of the formation. It is generally preferred that these phosphate compounds be present in concentrations of 1 percent or less by volume of the solution which is used as a vehicle to introduce them into the portion to be consolidated. In fact, concentrations less than 1 percent by volume are extremely useful and a very satisfactory range is from 0.25 to 1 percent by volume of the preflush fluid used to introduce them into the reservoir.

Subsequent to the injection of the epoxy-amino solution into the reservoir and within the "useful interval" of the epoxy-amino solution, the portion of the reservoir having the solution therein can be overflushed with the overflushing liquid. This overflushing liquid should be prepared to meet certain requirements which are (1) that the polyepoxides, polyamines and their reaction product be virtually insoluble in the over-flushing liquid and (2) that the solvent vehicle for the epoxy-amino mixture by miscible in the overflushing liquid. Liquids meeting these requirements are the predominantly aliphatic hydrocarbon fractions of crudes, such as brightstock oil, diesel oil, and the like. For example, a 1:1 mixture of brightstock and No. 2 diesel oil makes a good overflushing liquid for the practice of this invention. Other substances can be employed so long as the two requirements set forth above are satisfied, and such substances can be identified by persons skilled in the art.

In practice, it is sometimes desirable to adjust the viscosity of the overflushing liquid so that is exceeds that of the epoxy-amino solution dispersed in the reservoir to achieve more favorable results. Thus, brightstock and diesel oil may be blended to achieve the proper viscosity before injection into the reservoir and this often improves the strength of the consolidation made according to this invention.

Also, it is desirable to include some of the solvent vehicle in at least the initial portion of the overflushing liquid because this tends to make the partition of the "polymer-rich phase" more gradual and also slow down the initial extraction rate of the solvent vehicle from the polymer-rich phase. In general, the overflushing liquid is tailored to obtain the proper viscosity and about 5 percent of the volume of the overflushing liquid should be a solvent vehicle to give a gradual extraction rate.

PREFERRED EMBODIMENT OF THE INVENTION

A placement technique involving minimum operational risk and maximum flexibility typically required in conventional operations is described as follows:
1. The zone to be consolidated is perforated in casing fluid dense enough to hydrostatically overbalance exposed formation pressure.
2. A retrievable packer assembly with tubing wiper plug catcher and circulating valve is installed on internal-flush work tubing to isolate the perforated zone.
3. The zone being consolidated can be acidized to establish injectivity.
4. Treatment fluids separated by wiper plugs which are caught below the retrievable packer are pumped through the work tubing.
5. After waiting to allow resin curing, the differential pressure into this formation is abruptly increased by the release of the packer or opening of the circulation valve.
6. The work tubing assembly is pulled from the well, and if other zones are to be consolidated, steps 1 through 5 are repeated for each zone.
7. With all zones hydrostatically overbalanced, production tubing and associated equipment are installed.
8. The rig is removed. The well can be produced.

EXAMPLES ILLUSTRATING THE INVENTION

To demonstrate the physical extraction effected by overflushing, the following test was performed. A polyepoxide (Shell EPON 828) was mixed with a polyamine to which is added triphenyl phosphate and was mixed in a solvent, e.g., a mixture of ethyl acetate and liquid hydrocarbon until it represented 60 percent of the volume of the resulting solution. This solution was mixed with a small volume (approximately one-tenth of the solution) of a 1:1 mixture of brightstock and No. 2 diesel oil, thoroughly mixed, and the overflush subsequently separated from the mixture. The separated overflush was found to contain about 10 percent ethyl acetate by volume and the remaining polymer solution had increased measurably in viscosity.

In general, the amount of the overflushing liquid should be from 2 to 4 times the volume of the polymer solution dispersed in the reservoir. An optimum amount seems to be about 2 ½ times the volume of the polymer solution.

After the overflushing step was completed, the well was shut in until the resin completed its cure. The compressive strength of the tested formulations was doubled when treated with the above formulations as compared to a similar specimen from which the phosphate was omitted.

The following other examples are nonlimiting illustrations of the invention.

The systems used to consolidate Ottawa 17 sand (a 40—100 mesh round silica sand produced by Ottawa Silica Company, Ottawa 111.) which was then tested in compression before and after 30 days immersion in tap water at 160° F. Results are shown in table 1.

TABLE 1

| Coupling agent used and concentration, phr.* | Compressive strength, p.s.i. | |
|---|---|---|
| | Original | After 30 day soak at 160° F. |
| Control | 1,320 | 774  58% retention. |
| Triethylphosphate, 2.5 | 1,545 | 1,176  77% retention. |
| Tributylphosphate, 2.5 | 1,620 | 1,415  87% retention. |
| Triphenylphosphate, 2.5 | 1,985 | 1,520  77% retention. |
| Celluflex FR-2, 2.5 | 1,495 | 1,262  85% retention. |
| Celluflex RF-2, 2.0 | 1,630 | 1,360  84% retention. |

*Phr.=parts used per 100 part of resin.

The phosphates and quantities used were as follows: tributyl-2.5 pts., triethyl - 2.5 pts., triphenyl - 2.5 pts., Firemaster T-23P - 2.5 and 5.0 pts., Celluflex FR-2 - 2.5 and 5 pts.

After the formation has been consolidated by the process of the invention, oil can be recovered therefrom by conventional means such as by means of a drive fluid such as water and/or steam drives or miscible drive.

The fluid drives can contain thickeners, viscosity increasers, pushers and the like, e.g., polyacrylamides and derivatives, polyalkylene oxide polymers, polyvinyl-alcohol sulfonate and the like some of which are described in U.S. Pat. Nos. 3,341,319; 3,332,904; 3,254,719; 3,367,418; 3,368,620 and 3,370,649.

It is understood that various changes in the details described to explain the invention can be made by persons skilled in the art within the scope of the invention as expressed in the appended claims.

I claim:

1. An improved process for consolidating a loose earth formation in order to effect subsequent oil recovery therefrom comprising treating the loose oil producing zone of said formation as follows:
   a. injecting into the loose oil producing zone a preflush liquid comprising of a hydrocarbon liquid;
   b. injecting a resin consolidating composition comprising a liquid solvent containing therein (1) an epoxy resin, (2) an amine curing agent and (3) an organic phosphate ester accelerating agent;
   c. injecting an overflush liquid comprising of a blend of hydrocarbon oils; and
   d. maintaining the liquids (b) and (c) in the formation until consolidation of the treated formation is achieved.

2. The process of claim 1 wherein the preflush liquid (a) is a mixture of diesel oil and isopropyl alcohol the solvent (b) is a polar-containing solvent, the curing agent is an aromatic amine and the phosphate ester is a triaryl phosphate.

3. The process of claim 2 wherein the triaryl phosphate is triphenyl phosphate.

4. The process of claim 3 wherein after the formation is consolidated it is water flooded to recover oil.

5. The process of claim 1 wherein after the formation is consolidated it is water flooded to recover oil.